United States Patent [19]

Hanke

[11] 3,996,683
[45] Dec. 14, 1976

[54] FRAME FOR A TRANSPARENCY

[75] Inventor: Rudolf Hanke, Monheim, Schwaben, Germany

[73] Assignee: Hama Hamaphot KG., Hanke & Thomas, Monheim, Schwaben, Germany

[22] Filed: Oct. 30, 1975

[21] Appl. No.: 627,241

[30] Foreign Application Priority Data

Apr. 15, 1975 Germany .................. 2516493

[52] U.S. Cl. .................. 40/158 B; 40/152
[51] Int. Cl.² .................. C09F 1/12
[58] Field of Search .......... 40/152, 158 B, 152.1, 40/156; 29/235

[56] References Cited

UNITED STATES PATENTS

| 3,069,795 | 12/1962 | Lieberman | 40/152 |
| 3,470,643 | 10/1969 | Hans-Hermann Koeppe et al. | 40/152 |

FOREIGN PATENTS OR APPLICATIONS 1,201,649  7/1959  France .................. 40/152

Primary Examiner—John F. Pitrelli
Attorney, Agent, or Firm—Ross, Ross & Flavin

[57] ABSTRACT

A frame for a transparency is made in one piece with oppositely directed slots on opposite sides of its window to allow a film section to be snapped into the slots and retained thereby cooperant with a tool for snapping the transparency into position in the frame.

1 Claim, 10 Drawing Figures

U.S. Patent  Dec. 14, 1976  3,996,683
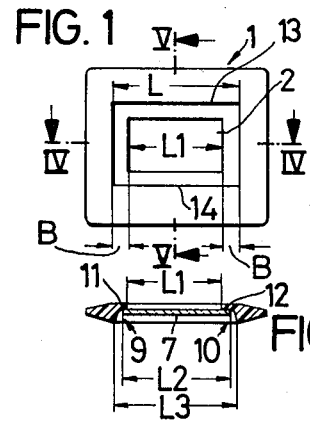
FIG.1
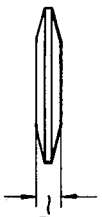
FIG.2
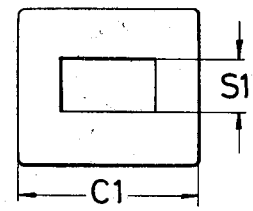
FIG.3
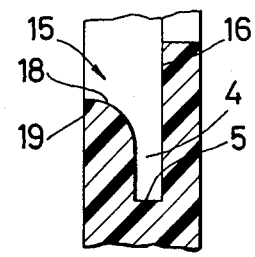
FIG.4
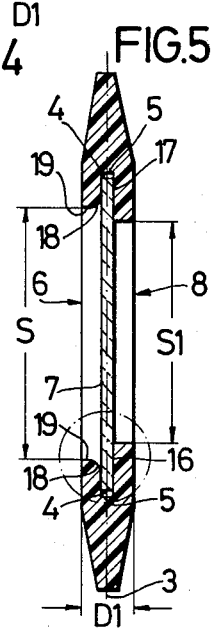
FIG.5
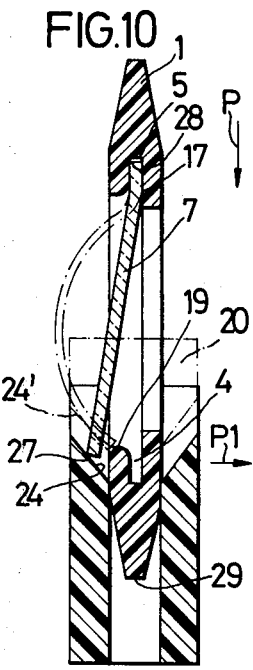
FIG.10
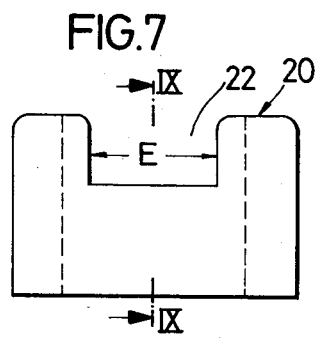
FIG.6
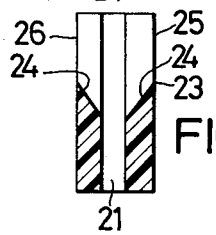
FIG.9
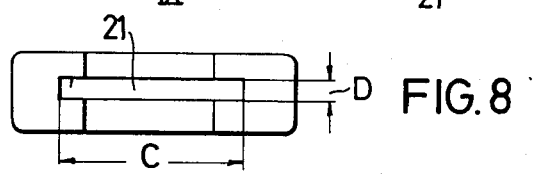
FIG.7 / FIG.8

FRAME FOR A TRANSPARENCY

This invention relates to a frame for a transparency such as a photographic slide cooperant with a tool for snapping the transparency into position in the frame.

A transparency frame made of plastic material is known which has a slit extending from one or both narrow edges of its window to the edge of the frame, via which slit a portion of a photographic film bearing an image can be inserted into the slide frame, means being provided for retaining the portion of the film in the inserted position.

This known frame is constructed from two parts which have to be assembled and connected securely together in manufacture. The production of the frame from two parts which have to be connected together is comparatively complicated and costly. Added to this is the fact that insertion of the film section into the slit requires certain skill, especially because it has to be effected manually and it is desirable that the operator not contact the image bearing part of the portion of film.

An object of the invention is to provide an improved frame for a transparency made of plastics material and having a window, from which at least at the longitudinal edges in the image plane slits for the insertion of a film section bearing the film image emanate, and characterized in that the slide frame is produced in one piece and further in that the length of the window is, on the side in front of the image plane, greater by at least sliding-fit play than the length of a film section, whereas the length of the window aperture on the side behind the image plane along with formation of a rebate is smaller than the length of the film section and in still further that the slits are in the form of grooves, the bottoms of which form stops for the film section that is to be inserted and are separated at least by the width of the film section, so that a film section can be snapped into the grooves which are open towards the window aperture.

The frame can be produced in a single operation as a one-piece component part and, because of the fact that the window aperture is greater, in front of the image plane, than the length of the film section, it is possible to snap the film into the grooves. Because these grooves are comparatively narrow and deep, satisfactory retention of the film section is ensured.

In order to facilitate insertion of the film into the grooves, it is advisable to make the width of the window, on the side in front of the image plane, greater than on the side situated behind the image plane, recesses or rabbets being provided accordingly. Thus the film section is guided by the recesses into the grooves.

The introduction of the film section into the grooves can be further facilitated by the longitudinal sides of the aperture being rounded-off, on the side lying in front of the image plane, towards the slits.

The snapping of a film section into the slide frame can be considerably facilitated by means of a tool in the form of a small block having a slit for pushing through the slide frame. The slit comprises two parallel sides, one side serving for the introduction of the slide frame and extending outwardly along an inclined plane. The through slit forms a guide for the slide frame, to be inserted, along its narrow edge.

In accordance with a preferred embodiment, the tool is designed as a shallow one piece plastic member rectangular in its cross-section.

The invention will be described further, by way of example, with reference to the accompanying drawings in which:

FIG. 1 shows a preferred embodiment of a slide frame in front view;
FIG. 2 shows the slide frame of FIG. 1 in side view;
FIG. 3 shows the slide frame of FIG. 1 in rear view;
FIG. 4 is a section taken along the line IV—IV in FIG. 1;
FIG. 5 is a section taken along the line V—V in FIG. 1, enlarged;
FIG. 6 is an enlarged view of the part encircled in FIG. 5;
FIG. 7 shows a tool for assisting the snapping-in of a film section into the slide frame, in front view;
FIG. 8 shows the tool of FIG. 7 in top view;
FIG. 9 is a section taken along the line IX—IX in FIG. 7;
FIG. 10 is a representation showing the use of the tool of FIGS. 7 to 9.

A flat slide frame 1, produced in one piece from plastic material and having a window 2, has slots 4, extending in the image plane 3, which are supplemented by end walls 5 into grooves, in which connection the end walls 5 form the groove bottoms. The slots 4 are respectively open towards the window 2 on the longitudinal sides thereof. Their end walls 5 are remote from one another at least by the width of the film section 7.

On the side 6 situated in front of the image plane, the length L of the window 2 is greater at least by sliding-fit play than the length L2 of the film section 7. On the side lying behind the image plane 3, the length L1 of the window aperture 2 is shorter in dimension than the length L2 of the film section 7. The arrangement defines recesses 9 and 10 with support parapets 11, 12 for the film section 7, the width 8 of which is correspondingly large.

On the side 6 situated in front of the image plane 3, the window aperture width S is greater than the window aperture width S1 on the side 8 situated behind the image plane 3. The arrangement is made such that on the window-aperture longitudinal sides 13 and 14, recesses 15 with support walls 16, 17 for the film section 7 are formed in which connection the support walls 16, 17 have a corresponding width.

Towards the side 6 lying in front of the image plane 3, the slots 4 merge with roundings 18 to the forward plane of the frame.

The window aperture length is, on the side 6 lying in front of the image plane 3, widened slightly to the extent L3 by means of a tapering of the walls.

A tool 20, serving for the snapping-in of a film section 7, is designed as a flat small block, rectangular in cross-section, which is made of plastic material and has a through slit 21, the width C of which is somewhat larger than the length C1 of a slide frame 1 and the width D of which is greater, to the extent of the play necessary for the pushing-through of the slide frame 1, than the thickness D1 of a slide frame 1.

The tool 20 has in the center region, on the upper side, an almost rectangular recess 22, the width E of which is greater than the length L2 of the film section 7, but is shorter than the length C1 of a slide frame 1. From the lower edge 23 bounding the recess 22, an inclined plane 24 leads to the through-slit 21, from both the outside 25 and from the outside 26. The inclination of the inclined plane 24 is so selected that, when the lower edge 27 of a film section 7 inserted into the upper slot 4 encounters the inclined plane 24, this lower edge 27 is pushed, upon use of the tool for the snapping-in of the film section, onto the lower soffit 19. It has been shown to be advantageous if the inclined plane is inclined by 45° relative to the through-slit in the longitudinal direction thereof.

For the insertion of a film section 7 into a slide frame 1, this film section is inserted by its upper longitudinal edge 28 (on the one perforation side) by hand into the upper slot 4, until the edge 28 encounters the end wall 5. This insertion by hand is very simple, because the upper edge 28 film section initially encounters the support wall 17 and from here is almost perforce introduced into the slot 4.

After the insertion of the film section 7 into the upper slot 4, the film section occupies approximately the position which is shown in FIG. 7 in solid lines. After the introduction into the upper slot 4, the film section 7 is already securely held in this upper slot 4. Now the slide frame 1 is pushed with its lower end 29 from above into the through-slit 21 of the tool 20, as is shown in FIG. 10 in fully solid lines. Upon the further pushing-through of the slide frame 1 in the direction of the arrow P through the through slit 21, the lower edge 27 of the film section 7 is forced by the inclined plane 24, which it has encountered, upwards and in the direction of the arrow P1 towards the side 8 lying behind the image plane 3. Consequently the film section 7 arches in its central region towards the side 6 lying in front of the film image plane 3, as is shown in dot-dash lines in FIG. 10. As soon as the slide frame 1 has been pushed so far in the direction of the arrow P through the through-slit 21 that the tool 20 occupies the position indicated in dot-dash lines, the lower edge 27 of the film section is pushed by the inclined plane, which now occupies the position designated by 24′, onto the lower soffit 19 of the slide frame 1. Upon further pushing-forward of the slide frame 1 in the direction of the arrow P, the inclined plane 24 forces the film section 7, abutting against it at this stage with a larger surface, towards the lower groove 4, so that the film section 7 is, because of its inherent springiness, finally snapped by the lower edge 27 into this groove 4. The slide frame 1 can now be removed from the tool 20. The film section 7 is inserted securely in the slide frame.

I claim:

1. A transparency frame and cooperant fitting tool for fitting a transparency to the frame comprising in combination:

a one-piece frame having a central window defining an image plane and opposite upper and lower transparency insertion slots in coincidence with the image plane and emanating from opposite longitudinal edges of the window, the window length forwardly of the image plane being greater than the transparency length for allowing a sliding-fit play between window and transparency, the window length rearwardly of the image plane being smaller than the transparency length, the opposite frame insertion slots having bottoms separated by at least the transparency width, and a fitting tool including a recess extending inwardly from one side thereof and communicating with a frame-receiving through-slot, the recess of the fitting tool defining an open mouth having an inclined lip leading inwardly and downwardly to the through-slot, all adapted and arranged for pushing the frame through the fitting tool through-slot with the upper transparency edge being nested within the upper frame insertion slot in effecting camming of the lower transparency edge into the lower frame insertion slot upon contact with the inclined tool lip.

* * * * *